United States Patent
Lang

Patent Number: 5,355,918
Date of Patent: Oct. 18, 1994

[54] GRINDER BEAM DRIVE FOR A TREE STUMP GRINDER

[76] Inventor: William J. Lang, 2540 Glidden Rd., Beaverton, Mich. 48612

[21] Appl. No.: 91,557

[22] Filed: Jul. 14, 1993

[51] Int. Cl.⁵ ................................................ B27C 9/00
[52] U.S. Cl. .................................. 144/2 N; 144/375; 241/101.7
[58] Field of Search ....................... 144/2 N, 218, 375; 241/101.7, 191, 292.1, 277, 293

[56] References Cited

U.S. PATENT DOCUMENTS

| | | |
|---|---|---|
| 346,681 | 8/1886 | Perry . |
| 546,747 | 2/1896 | Gutenkunst . |
| 578,234 | 3/1897 | Gutenkunst . |
| 3,018,972 | 1/1962 | Steinmetz . |
| 3,198,224 | 8/1965 | Hiley . |
| 3,389,726 | 6/1968 | Good . |
| 3,868,980 | 3/1975 | Blum . |
| 3,931,841 | 1/1976 | Blum . |
| 4,339,908 | 7/1982 | Johnson . |
| 5,158,126 | 10/1992 | Lang ................................ 144/2 N |

FOREIGN PATENT DOCUMENTS

908283  2/1982  .

OTHER PUBLICATIONS

Rotary Power Inc. brochure, SMA Motors.

*Primary Examiner*—W. Donald Bray
*Attorney, Agent, or Firm*—Learman & McCulloch

[57] ABSTRACT

The tree stump grinder assembly (12) includes a drum (176) with end flanges (178 and 180) and a central flange (182). A left hand stub shaft (102) is journaled in the drum (176) by spaced apart roller bearings (122 and 124), a bearing hub (126), and a circular plate (160) attached to an end flange (178). A right hand stub shaft (212) is journaled in the drum (176) by spaced apart bearings (218 and 222), a bearing hub (224) and a circular plate (258) attached to an end flange (180). The central spindle (114) of a hydraulic motor (116) is non-rotatably secured to the left hand stub shaft (102). The housing 144 of the hydraulic motor (116) is journaled on the central spindle (114) and is rotated relative to the spindle when hydraulic fluid is supplied through supply passage 306 and is returned to the sump (328) through a return passage (310). Rotation of the housing (144) drives the drum (176) through keys (202, ring member (194) and the central flange (182). Bit and block assemblies (280) on the outside surface of the drum (176) can grind tree stumps and other material. Seals (146, 246, 152 and 252) protect the roller bearings 122, 124, 218 and 222) from solid and liquid materials outside the drum (176).

13 Claims, 3 Drawing Sheets

GRINDER BEAM DRIVE FOR A TREE STUMP GRINDER

TECHNICAL FIELD

The invention relates to a machine with a grinding drum for grinding tree stumps and tree roots and specifically to a drive for rotating a grinder drum for grinding tree stumps that are still anchored to the ground by their roots.

BACKGROUND OF THE INVENTION

The tree stump grinder drum drive is an improvement in the tree stump grinder disclosed in my U.S. Pat. No. 5,158,126 issued Oct. 27, 1992, the disclosure of which is incorporated herein by reference.

The stump grinder drum is rotatably mounted on the boom of an excavator or a backhoe. The excavator or backhoe transport the drum to the site where a tree stump is to be ground. The boom on the excavator moves the drum into contact with a tree stump or a tree root. A hydraulic motor rotates the drum so that the bits on the outer surface of the drum grind up the tree stump and tree roots. The tree stump and tree roots are ground up into chips in the area where the tree grew. The wood chips improve the fertility of the soil. By grinding tree stumps and tree roots into wood chips where they grew, it is possible to eliminate removal, transport and disposal problems. The tree stumps are anchored and held by their roots during the early stages of the grinding operation. The grinder drum moves soil and rocks near the tree stumps and tree roots during grinding, thereby permitting the grinder drum to grind up all of a tree stump and all of the larger roots.

The excavator or backhoe which the grinder drum is mounted on is preferably a relatively large heavy machine. The excavator or backhoe can transfer several tons of its total weight to the grinder drum to increase grinding speed or it can hydraulically squeeze a tree stump between the grinder drum and an anchor assembly thereby placing an even larger load on the grinder drum. A hydraulic motor is mounted inside the drum. A hydraulic pump driven by a diesel engine supplies hydraulic fluid to the hydraulic motor under pressure. It is preferable to provide a second diesel engine with over 250 horsepower that drives the hydraulic pump for the grinder drum only. The excavator engine may have insufficient power to operate the excavator and to drive the stump grinder drum at the same time.

The grinder drum must be supported by large bearings that can withstand the large radial loads that may be applied to the grinder drum. The grinder drum also has to withstand axial loads that tend to deflect the drum end plates. The hydraulic motor which drives the drum must be sufficiently large to provide the required torque, compact to fit inside the grinder drum and long lasting. The bearings which support the grinder drum must be adequately lubricated and sealed. The seals must keep lubricant in and keep foreign material such as dirt, sand, rocks, water, roots and wire out.

SUMMARY OF THE INVENTION

An object of the invention is to provide a tree stump grinder drum with bearing support that minimizes grinder drum deflection under all loads that can be applied by the weight of the machine or that can be applied hydraulically by the machine upon which the grinder drum is mounted.

Another object of the invention is to isolate a hydraulic drive motor for driving a stump grinder drum from all bending and shear loads applied to the driven grinder drum.

A further object of the invention is to provide a stump grinder drum with an internally mounted hydraulic drive motor that is easy to remove for repair and easy to mount inside the grinder drum.

A still further object of the invention is to provide a stump grinder drum with a hydraulic drive motor mounted inside the drum that has improved hydraulic fluid conduits and a seal system that reduces the possibility of hydraulic fluid leaks.

The tree stump grinder is an attachment that is preferably mounted on a vehicle such as an excavator or a backhoe. The vehicle can be supported on wheels or tracks. A boom is pivotally connected to the vehicle frame. Hydraulic boom cylinders are attached to the vehicle frame and to the boom to pivot the boom about its pivotal connection to the vehicle frame. A stick is pivotally attached to the boom. A hydraulic cylinder is connected to the boom and to the stick for pivoting the stick about its pivotal connection to the boom.

A yoke is pivotally attached to the free end of the stick. The yoke includes a center portion and a pair of arms. A stump grinder drum is rotatably supported, at each of its ends, on stub shafts that are rigidly secured to the arms of the yoke. Two spaced apart roller bearings are mounted on each stub shaft. The roller bearings are mounted in bores inside bearing hubs. One bearing hub is rotatably journaled by two of the spaced apart roller bearings on each stub shaft. An end plate is bolted to each bearing hub and to an end flange near each end of the grinder drum. The end flanges extend radially inward toward the center of the drum.

The crankshaft of the hydraulic motor is anchored to one of the stub shafts. The hydraulic motor receives hydraulic fluid under pressure through the stub shaft and through the crankshaft attached to the stub shaft. The crankshaft routes oil to a plurality of cylinders and pistons. The crankshaft and stub shaft also receive oil from the cylinders and route the oil back to the pump. The cylinders are inside a cylinder block that is rotatably journaled on the crankshaft. The pistons in the cylinders press against reaction surfaces inside a housing. Hydraulic fluid is routed to and from the cylinders in the cylinder block to oscillate the cylinder block relative to the housing. This movement of the cylinder block relative to the housing causes the cylinder block to rotate about the axis of a cylindrical cam on the crankshaft and the housing to rotate about the axis of the crankshaft. A cylindrical outer surface on the hydraulic motor housing passes through a bore in a drive flange inside the grinder drum. The drive flange extends radially inward from the inside of the grinder drum and is between the two end flanges. The drive flange is connected to the hydraulic motor housing by keys. Output torque from the hydraulic motor is transferred from the hydraulic motor housing to the drive flange and the grinder drum through the keys. In the event of an overload, the keys can shear. When the keys are sheared, the hydraulic motor housing is free to rotate relative to the grinder drum and the drive flange.

Other objects and advantages of the invention will become more apparent from the following description

THE DRAWINGS

DETAILED DESCRIPTION

Figure 1:
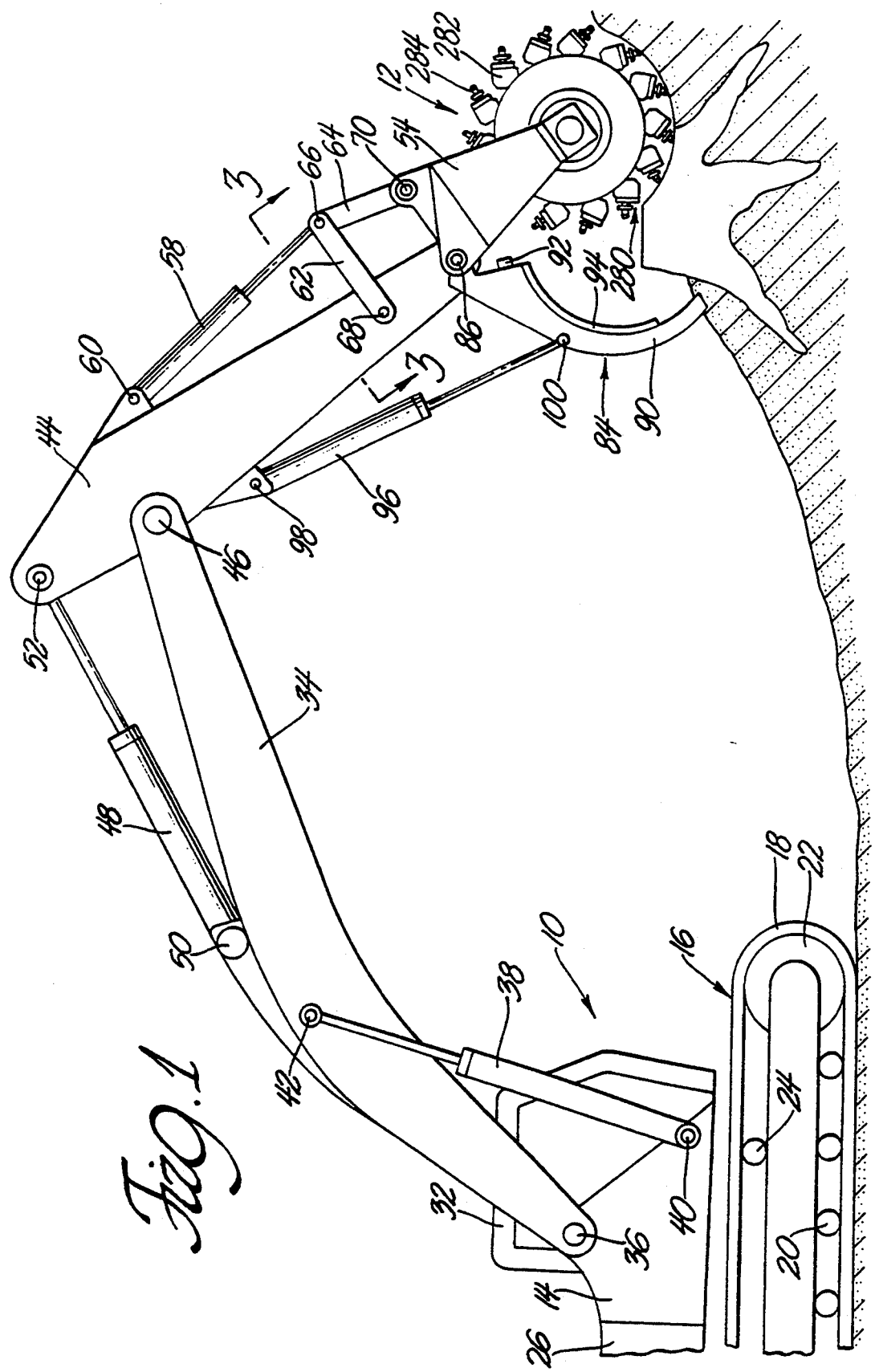
FIG. 1 is a side elevational view of a portion of an excavator with a stump grinder assembly and an anchor assembly attached to the excavator boom and stick.

An excavator 10 is shown in FIG. 1 with a stump grinder assembly 12 attached. The excavator 10, a portion of which is shown, has a main frame 14 which is rotatably supported on a track frame assembly 16 for pivotal movement about a generally vertical axis. The track frame assembly 16 includes two tracks 18 that are trained around track rollers 20, idler wheels 22, track carrier rollers 24 and drive sprockets (not shown). The engine compartment 26 on the main frame 14 houses an internal combustion engine for driving the excavator. The engine compartment 26 also houses an internal combustion engine 28 for driving a pump 30 that drives the stump grinder assembly 12. An operator's cab 32 mounted on the main frame 14 encloses a work station with controls for operating the excavator 10 and the stump grinder assembly 12.

A boom 34 is pivotally attached to the main frame 14 by a generally horizontal pivot pin 36. A pair of hydraulic boom cylinders 38 are connected to the main frame 14 by pins 40 and to the boom 34 by support pins 42. The double acting hydraulic boom cylinders 38 pivot the boom 34 about the axis of the pivot pin 36 to raise and lower the upper end of the boom.

A stick 44 is pivotally attached to the upper end of the boom 34 by a pivot pin 46. A double acting hydraulic stick cylinder 48 is connected to the boom 34 by a pin 50 and to the stick 44 by a pin 52. The double acting hydraulic stick cylinder 48 pivots the stick 44 about the axis of the pivot pin 46 relative to the boom 34.

Figure 3:
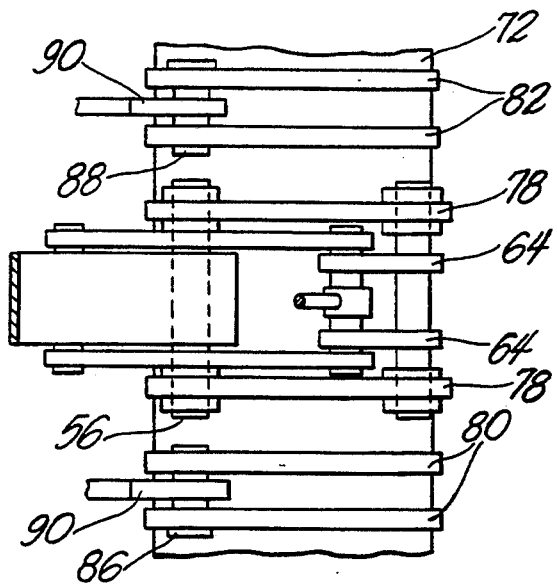
FIG. 3 is an enlarged sectional view taken along line 3—3 of FIG. 1 showing the mounting system for pivotally attaching the yoke and the anchor assembly to an excavator stick.
Figure 5:
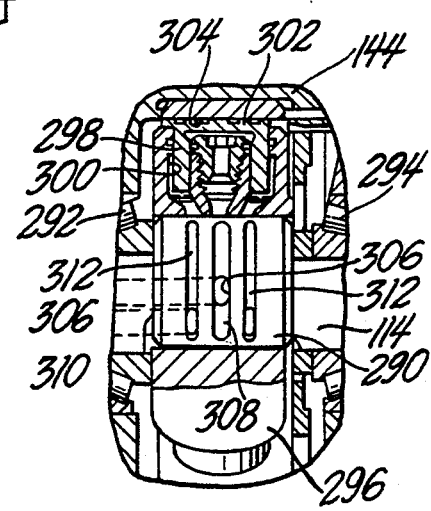
FIG. 5 is a cross-sectional view of a portion of the hydraulic motor.
Figure 4:
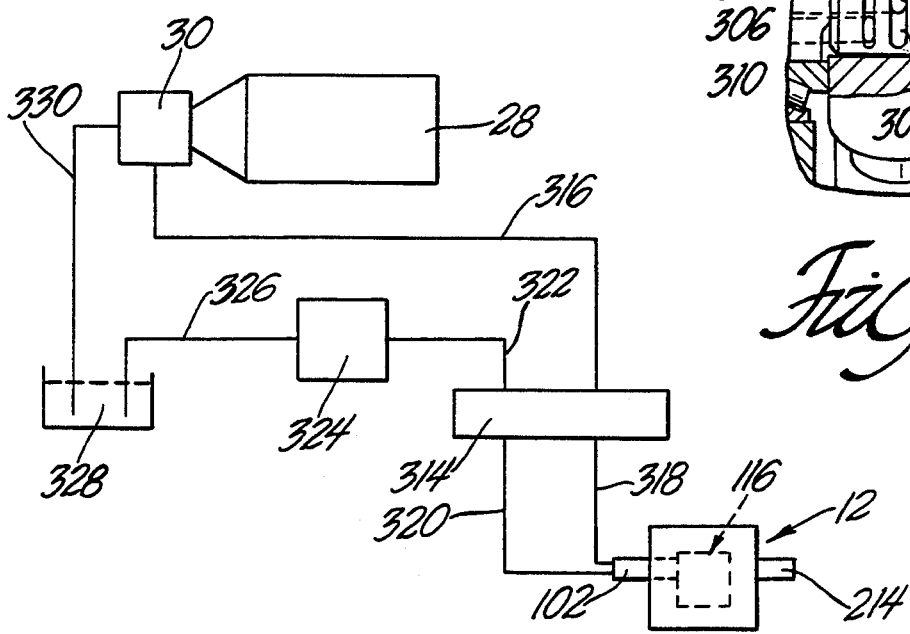
FIG. 4 is a schematic of the hydraulic system for rotating the grinder drum.

A yoke 54 is pivotally attached to the lower end of the stick 44 by a pin 56 shown in FIG. 3. A double acting hydraulic grinder swing cylinder 58 is attached to the stick 44 by a pin 60. The hydraulic grinder swing cylinder 58 is also attached to a pair of links 62 and to links 64 by a pin 66. The links 62 are attached to the stick 44 by a pin 68. The links 64 are attached to the yoke 54 by a pin 70. The double acting hydraulic grinder swing cylinder 58 pivots the yoke 54 about the axis of the pin 56 relative to the stick 44. The links 62 and the links 64 increase the range of movement of the yoke 54 about the axis of the pivot pin 56.

Figure 2:
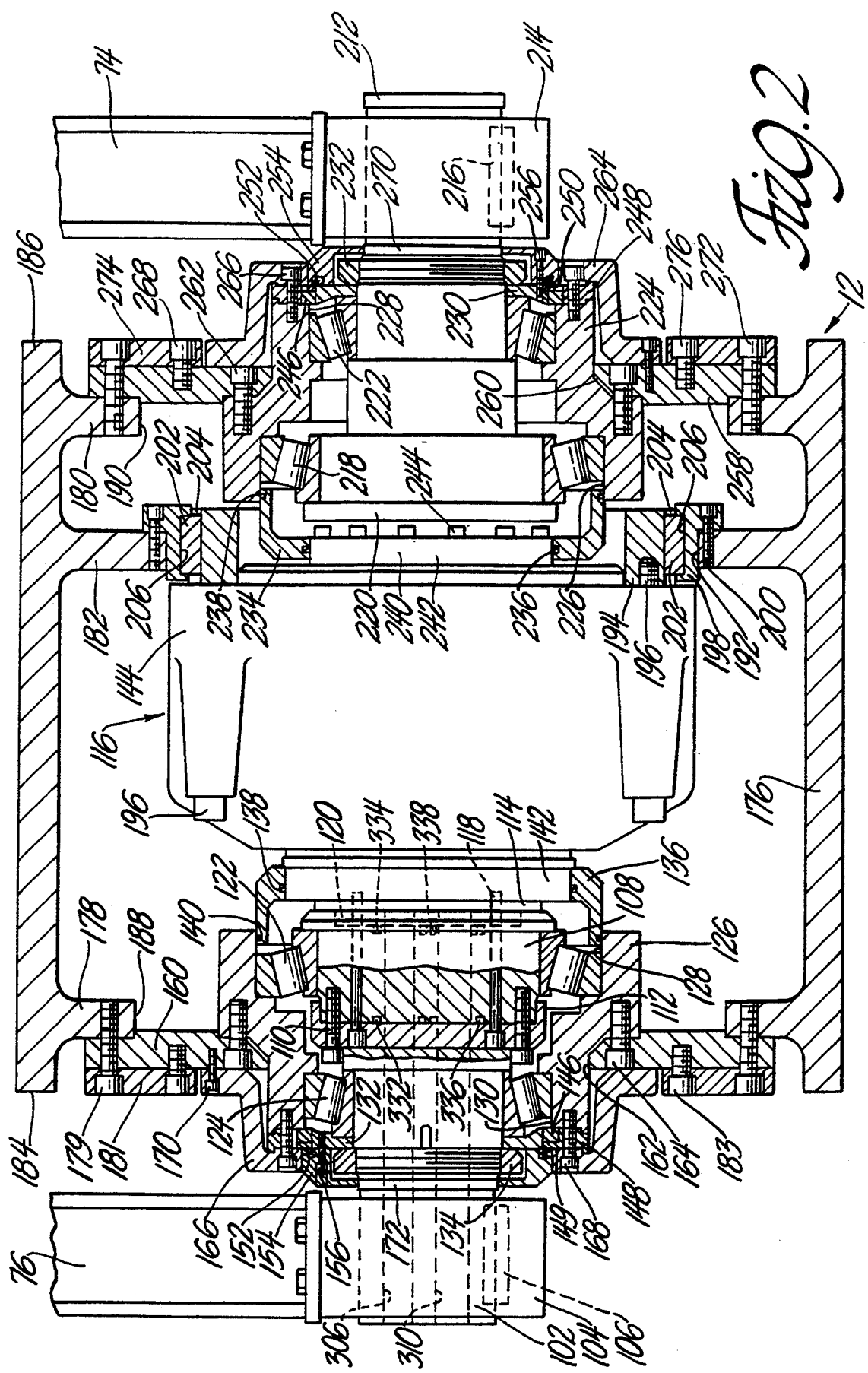
FIG. 2 is an enlarged cross-sectional view of the stump grinder drum with a portion of the yoke.

The yoke 54, as shown in FIG. 1 and as partially shown in FIG. 2 and FIG. 3, has a center portion 72 and a pair of arms 74 and 76. A pair of plates 78 are integral with the center portion 72 of the yoke 54. The pin 56 passes through a pair of aligned bores in the plates 78. The pin 70 is spaced from the pin 56 and also passes through bores in the two links 64.

A pair of plates 80 are integral with the center portion 72 of the yoke 54 and to one side of the plates 78. Another pair of plates 82 are integral with the center portion 72 of the yoke 54 and to the other side of the plates 78. An anchor assembly 84, shown in FIG. 1 and partially shown in FIG. 3, is pivotally attached to the yoke 54 by a pin 86 which passes through aligned bores in the plates 80 and by a pin 88 which passes through aligned bores in the plates 82. The pins 86 and 88 are in axial alignment with the pin 56 which attaches the yoke 54 to the stick 44. The anchor assembly 84 includes a plurality of tines 90 which are secured to each other at the top by a bar 92 and by an arcuate plate 94. Only two of the tines 90 have extensions with bores that receive the pins 86 and 88. A double acting anchor cylinder 96 is connected to the stick 44 by a pin 98 and to the anchor assembly 84 by a pin 100. The portions of the tines 90 which extend down below the arcuate plate 94 can be manipulated to rake up tree roots that are in the ground, to hold brush and other material for grinding, and to anchor or hold the stick 44 during grinding by the stump grinder assembly 12. The arcuate plate 94 can also be manipulated to cover holes and to move some soil.

The stump grinder assembly 12, as shown in FIG. 2, includes a left hand stub shaft 102 that is secured to a mounting block 104. A key 106 prevents rotation of the left hand stub shaft 102 relative to the mounting block 104. The mounting block 104 is attached to the arm 76 of the yoke 54 by bolts or other suitable fasteners. An extension shaft 108 is secured to the left hand stub shaft 102 by bolts 110 and an alignment flange 112 that is integral with the stub shaft. The extension shaft 108 is attached to the central spindle 114 of a hydraulic motor 116 by bolts 118. Axial alignment between the central spindle 114 and the extension shaft 108 is maintained by a projection 120 on the central spindle that extends into a bore in the extension shaft 108.

An inner roller bearing 122 is mounted on the extension shaft 108. An outer roller bearing 124 is mounted on the left hand stub shaft 102. A bearing hub 126 with spaced apart bearing bores 128 and 130 receive the inner and outer roller bearings 122 and 124. A spacer ring 132 and a threaded nut 134 adjust the axial load on the inner and outer roller bearings 122 and 124.

The inner and outer roller bearings 122 and 124 are packed with a roller bearing lubricant. A seal ring 136 with 0-rings 138 and 140 seals between the bearing hub 126 and a cylindrical surface 142 on the housing 144 of the hydraulic motor 116. After assembly, the seal ring 136, the cylindrical surface 142 and the bearing hub 126 rotate together at the same speed. There is therefore no relative movement between the 0-rings 138 and 140 and the surfaces they are in sealing contact with. A seal assembly is also provided that includes a sealing ring 146 that rotates with the bearing hub 126 and is in sliding contact with a cylindrical surface on the spacer ring 132 that remains fixed with the left hand stub shaft 102. The sealing ring 146 is held in position by a seal retainer ring 148. A washer member 149 is an integral part of the seal retainer ring 148. The washer member 149 has a smooth rub surface on its outboard side. A resilient seal 152 with a V-shaped cross-section is mounted inside a seal guard 154. The seal guard 154 is attached to the spacer ring 132 by bolts 156. The resilient seal 152 with a V-shaped cross-section remains stationary with the left hand stub shaft 102, the spacer ring 132 and the threaded nut 134 while the bearing hub 126 rotates. The resilient seal 152 with a V-shaped cross-section seals against the smooth rub surface of the washer member 149 that rotates with the bearing hub 126.

A circular plate 160 with a central bore 162 receives the bearing hub 126 and is secured to the bearing hub by bolts 164. A wear shield 166 protects the bolts 164 and is secured to the bearing hub 126 by bolts 168 and to the circular plate 160 by bolts 170. The bolts 168 also secure the seal retainer ring 148 and the washer member 149 to the bearing hub 126.

The sealing ring 146 rotates with the bearing hub 126 and seals against the spacer ring 132 secured to the left hand stub shaft 102 to retain lubricant for the inner and outer roller bearings 122 and 124 in the bearing hub 126. The resilient seal 152, which remains fixed to the left hand stub shaft 102 seals against the washer member 149 to keep water and dirt from entering the bearing hub 126. The seal guard 154 has a central bore which fits snugly against the cylindrical surface 172 on the left hand stub shaft 102. The seal guard 154 keeps material such as wire and brush, which might be wound around the stub shaft 102 during operation of the stump grinder assembly 12, from being forced past the seals and into the bearing hub 126.

The stump grinder assembly 12 also includes a drum 176 with end flanges 178 and 180 and a central flange 182. The end flanges 178 and 180 extend radially inward from the drum 176 and are spaced inwardly from the axial ends 184 and 186 of the drum. The end flanges 178 and 180 have central bores 188 and 190 which are larger in diameter than the outside diameter of the housing 144 of the hydraulic motor 116. The central flange 182 extends radially inward from drum 176 between the end flanges 178 and 180. The central flange 182 forms a circular opening or bore 192. The bore 192 has a diameter which is smaller than the diameter of the central bores 188 and 190 through the end flanges 178 and 180.

The housing 144 of the hydraulic motor 116 is rotatably supported by the central spindle 114 of the hydraulic motor. The housing 144 includes a ring member 194 that extends into the bore 192 in the central flange 182. The ring member 194 is secured to the housing 144 by bolts 196. A hardened steel ring 198 is mounted in the bore 192 in the central flange 182 and secured to the central flange by bolts 200. The ring member 194 on the housing 144 extends into the central bore 200 of the hardened steel ring 198. Keys 202 in keyways 204 in the ring member 194 and keyways 206 in the hardened steel ring 198 transmit torque from the housing 144 of the hydraulic motor 116 to the drum 176 through the hardened steel ring 198 and the central flange 182. Two keys 202 are shown in FIG. 2. The number of keys 202 can be varied as required to drive the drum 176. In the event of a torque overload the keys 202 will shear and the housing 144 and the ring member 194 will rotate relative to the hardened steel ring 198 and the drum 176. If the keyways 204 or 206 are damaged the ring member 194 or the hardened steel ring 198 can be easily and quickly replaced. Normally a hydraulic motor 116 will stop running if there is an overload. When a hydraulic motor 116 is overloaded there is insufficient hydraulic pressure to run the motor and it stops. The keys 202 will not therefore shear under normal circumstances. The keys 202 are an additional safety feature to protect the stump grinder assembly 12 from damage.

The circular plate 160 is secured to the end flange 178 of the drum 176 by bolts 179. The bolts 179 are recessed in a rub ring 181. The rub ring 181 is secured to the outboard surface of the circular plate 160 by bolts 183 as well as the bolts 179.

A right hand stub shaft 212 is secured to the mounting block 214. A key 216 prevents rotation of the right hand stub shaft 212 relative to the mounting block 214. The mounting block 214 is attached to the arm 74 of the yoke 54 by bolts or other suitable fasteners. An inner roller bearing 218 is mounted on the stub shaft 212 adjacent to the integral stub shaft end flange 220. An outer roller bearing 222 is also mounted on the right hand stub shaft 212. A bearing hub 224 with spaced apart bearing bores 226 and 228 receives the inner and outer roller bearings 218 and 222. A spacer ring 230 with a threaded nut 232 adjust the axial load on the inner and outer roller bearings 218 and 222.

The inner and outer roller bearings 218 and 222 are packed with a roller bearing lubricant. A seal ring 234 with 0-rings 236 and 238 seals between the bearing hub 224 and the cylindrical surface 240 on a cover plate 242 attached to the housing 144 by bolts 244. The seal ring 234, the bearing hub 224 and the cover plate 242 rotate together at the same speed except when the keys 202 are sheared. There is therefore no relative movement between the 0-rings 236 and 238 and the surfaces the 0-rings are in sealing contact with except when the keys 202 are sheared.

A seal assembly is also provided that includes a sealing ring 246 that rotates with the bearing hub 224 and is in sliding contact with a cylindrical surface on the spacer ring 230. The spacer ring 230 is secured to the right hand stub shaft 212 by the nut 232 and does not rotate. The sealing ring 246 is held in position by a seal retainer ring 248. A washer member 250 is an integral part of the seal retainer ring 248. The washer member 250 has a smooth rub surface on its outboard side. A resilient seal 252 with a V-shaped cross-section is mounted inside a seal guard 254. The seal guard 254 is attached to the spacer ring 230 by bolts 256. The resilient seal 252 with a V-shaped cross-section remains in a fixed position relative to the right hand stub shaft 212, the spacer ring 230 and the threaded nut 232 while the bearing hub 224 rotates. The resilient seal 252 with a V-shaped cross-section seals against the smooth rub surface on the washer member 250 of the seal retainer ring 248. The seal retainer ring 248 and washer member 250 rotate with the bearing hub 224.

A circular plate 258 with a central bore 260 receives the bearing hub 224 and is secured to the bearing hub by bolts 262. A wear shield 264 protects the bolts 262 and is secured to the bearing hub 224 by bolts 266 and to the circular plate 258 by bolts 268. The bolts 266 also secure the seal retainer ring 248 and the washer member 250 to the bearing hub 224.

The sealing ring 246 rotates with the bearing hub 224 and seals against the spacer ring 230 secured to the right hand stub shaft 212 to retain lubricant for the inner and outer roller bearings 218 and 222 in the bearing hub 224. The resilient seal with a V-shaped cross-section seals against the smooth rub surface on the outboard side of the washer member 250 to keep water and dirt from entering the bearing hub 224. The seal guard 254 has a central bore which fits snugly against the cylindrical surface 270 on the right hand stub shaft 212. The seal guard 254 keeps material such as wire and brush, which might be wound around the stub shaft 212 during operation, from being forced past the seals and into the bearing hub 224. The diameter of the cylindrical surface 270 is smaller than the diameter of the threads engaged by the threaded nut 232 so that the seal guard 254 covers the threaded nut 232 and the threads on the stub shaft 212. The circular plate 258 is also secured to the end flange 180 of the drum 176 by bolts 272. The heads of bolts 272 are recessed in a rub ring 274. The rub ring 274 is secured to the outboard surface of the circular plate 258 by bolts 276 as well as the bolts 272.

A plurality of bit and block assemblies 280 are secured to the outer surface of the drum 176. The bit and block assemblies 280 are not shown in FIG. 2. Each of the bit and block assemblies 280 includes a block 282 that is welded to the outside surface of the drum 176. A bit 284 is mounted in and retained by each block 282. The bits 284 can be replaced if broken or if they are excessively worn. The bit and block assemblies 280 are arranged on the surface of the drum 176 in a pattern which insures grinding of material along the entire length of the drum.

The hydraulic motor 116 can be one of a number of different types of motors. The hydraulic motor 116 can, for example, be a radial piston cam motor. A radial piston cam motor, which is commercially available has a central spindle 114 with a cylindrical cam 290. The central spindle 114 is attached to and supported by the yoke 54 as described above. The housing 144 is rotatably supported on the central spindle 114 by roller bearings 292 and 294. A cylindrical block 296 is journaled on the cylindrical cam 290. Five pistons 298 are mounted in radially extending bores 300 in the cylindrical block 296. The radially outboard ends 302 of the pistons 298 press against and slide on flat surfaces 304 on the inside of the housing 144. Hydraulic fluid is supplied to the pistons through supply passage 306 and a crankshaft gallery 308 in the central spindle 114. Hydraulic fluid is received from the pistons 298 through a return gallery (not shown) and a return passage 310. Leakage from the pistons 298 and the radially extending bores 300 is picked up by the scavenging galleries 312. The scavenging galleries 312 are connected to the return passage 310. The crankshaft gallery 308 and the return gallery are positioned so that hydraulic fluid supplied to the five pistons 298 moves the cylindrical block 296 in an orbital path relative to the housing 144, rotates the cylindrical block relative to the cylindrical cam 290 on the central spindle 114 and rotates the housing relative to the central spindle. Rotation of the housing 144 relative to the central spindle 114 rotates the drum 176.

Hydraulic fluid for driving the stump grinder assembly 12, is supplied by a dedicated internal combustion engine 28 and a hydraulic pump 30. The hydraulic pump 30 supplies hydraulic fluid to a control valve 314 through a hydraulic line 316. The control valve 314 supplies hydraulic fluid under pressure through a hydraulic line 318 to the supply passage 306 in the central spindle 114 and in the left hand stub shaft 102. Return oil from the return passage 310 in the central spindle 114 and the left hand stub shaft 102 is conveyed to the control valve 314 by a hydraulic line 320. The control valve 314 directs return oil through a hydraulic line 322 to an oil cooler 324 and through a hydraulic line 326 to a sump 328. Cooled oil in the sump 328 is returned to the pump 30 by a hydraulic line 330.

The supply passage 306 and the return passage 310 are both in the left hand stub shaft 102, the extension shaft 108 and the central spindle 114. O-ring seals 332 and 334 are provided in the extension shaft 108 to prevent leakage from the supply passage 306. O-ring seals 336 and 338 are provided in the extension shaft 108 to prevent leakage from the return passage 310.

To stop the hydraulic motor 116 from rotating the drum 176, the control valve 314 is switched to direct hydraulic fluid from the pump 30 to the sump 328 rather than to the stump grinder assembly 12.

The invention has been described in detail in connection with a preferred embodiment. Some of the details will vary depending upon the design, capabilities and limitations of the excavator or other machines to which the stump grinder assembly 12 is attached. The preferred embodiment is therefore an example only and the invention is not restricted thereto. Those skilled in the art will understand that variations and modifications can be made within the scope of the invention.

I claim:

1. A tree stump grinder assembly including a first yoke arm, a second yoke arm, a first stub shaft non-rotatably attached to the first yoke arm, a drum with a central axis and two ends having one end journaled on the first stub shaft for rotation of the drum relative to the first stub shaft about the central axis of the drum, a second stub shaft operable to support the other end of the drum on the second yoke arm for rotation about the central axis of the drum, a hydraulic motor within said drum having a central spindle non-rotatably attached to the first stub shaft, said hydraulic motor further including a hydraulic motor housing rotatably mounted on said central spindle and secured to the drum to rotate the drum about said central axis, and a plurality of grinding tools secured to the drum.

2. A tree stump grinder assembly, as set forth in claim 1, wherein the hydraulic motor housing is secured to the drum by at least one key that will shear when subjected to a torque overload.

3. A tree stump grinder assembly, as set forth in claim 1, wherein a ring with a central bore and at least one keyway is secured to the drum and a portion of the hydraulic motor housing has at least one keyway and extends into the central bore in the ring, and the hydraulic motor housing is secured to the drum by a key that is received in the keyway in the drum and the keyway in the hydraulic motor housing.

4. A tree stump grinder assembly as set forth in claim 3 wherein the ring with a central bore is secured to the drum by bolts.

5. A tree stump grinder assembly, as set forth in claim 1, wherein the first stub shaft has internal bores for supplying hydraulic fluid to the hydraulic motor and for conveying hydraulic fluid away from the hydraulic motor.

6. A tree stump grinder assembly as set forth in claim 1 wherein the second stub shaft is nonrotatably secured to the second yoke arm and the other end of the drum is journaled on the second stub shaft for rotation of the drum relative to the second stub shaft about the central axis of the drum.

7. A tree stump grinder assembly as set forth in claim 1 wherein the drum is journaled on the first stub shaft by a pair of spaced apart bearings.

8. A tree stump grinder assembly as set forth in claim 6 wherein the drum is journaled on the first stub shaft by a pair of spaced apart bearings and the drum is journaled on the second stub shaft by a pair of spaced apart bearings.

9. A tree stump grinder assembly as set forth in claim 1 wherein the drum is journaled on the first stub shaft by at least one bearing, the bearing is protected by a first seal that keeps lubricant in the bearing and a second seal that keeps water and other liquids out of the bearing.

10. A tree stump grinder assembly as set forth in claim 9 including a seal guard which protects the seals from material that wraps around the first stub shaft.

11. A tree stump grinder assembly including a first yoke arm, a second yoke arm, a first stub shaft non-rotatably attached to the first yoke arm, a drum with a central axis and two ends having one end journaled on the first stub shaft for rotation of the drum relative to the first stub shaft about the central axis of the drum, a second stub shaft operable to support the other end of the drum on the second yoke arm for rotation about the central axis of the drum, a hydraulic motor within said drum having a central spindle non-rotatably attached to the first stub shaft, a hydraulic motor housing secured to the drum by at least one key to rotate the drum about said central axis and wherein the key will shear when subjected to a torque overload, and a plurality of grinding tools secured to the drum.

12. A tree stump grinder assembly including a first yoke arm, a second yoke arm, a first stub shaft non-rotatably attached to the first yoke arm, a drum with a central axis and two ends having one end journaled on the first stub shaft for rotation of the drum relative to the first stub shaft about the central axis of the drum, a second stub shaft operable to support the other end of the drum on the second yoke arm for rotation about the central axis of the drum, a hydraulic motor within said drum having a central spindle non-rotatably attached to the first stub shaft, a hydraulic motor housing secured to the drum to rotate the drum about said central axis, a plurality of grinding tools secured to the drum and wherein a ring with a central bore and at least one keyway is secured to the drum and a portion of the hydraulic motor housing has at least one keyway and extends into the central bore in the ring, and the hydraulic motor housing is secured to the drum by a key that is received in the keyway in the drum and the keyway in the hydraulic motor housing.

13. A tree stump grinder assembly as set forth in claim 12 wherein the ring with a central bore is secured to the drum by bolts.

* * * * *